No. 710,309. Patented Sept. 30, 1902.
M. WEISSER.
TELEPHONE TRANSMITTER.
(Application filed Jan. 11, 1902.)
(No Model.)
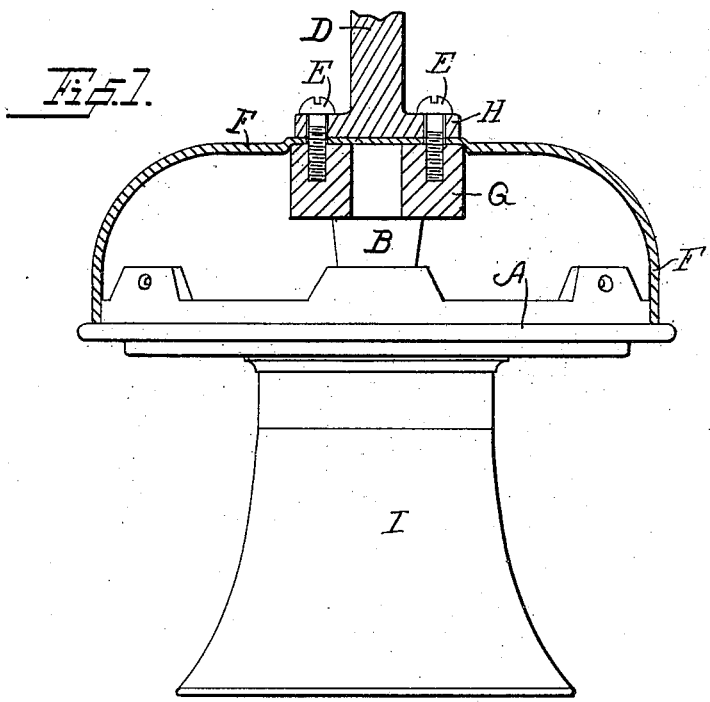
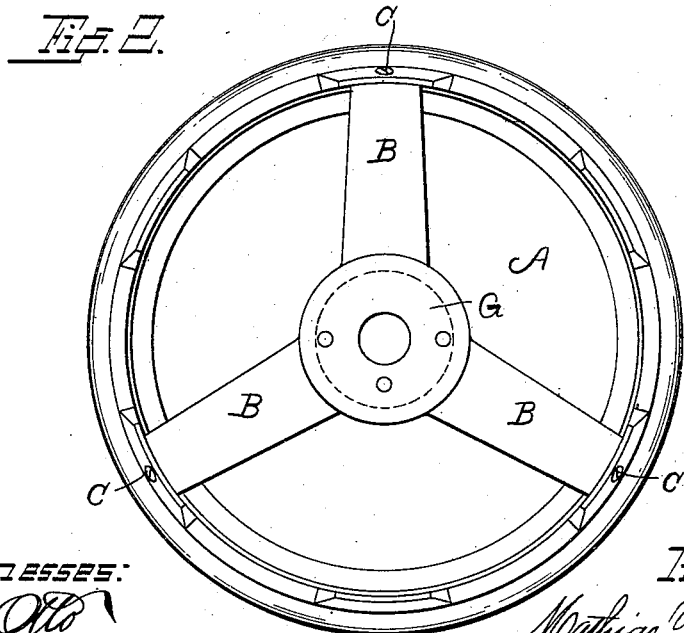
Witnesses:
F. A. Otto
C. L. Roesch
Inventor
Mathias Weisser
By Erwin & Whelen
Attorneys.

UNITED STATES PATENT OFFICE.

MATHIAS WEISSER, OF MILWAUKEE, WISCONSIN.

TELEPHONE-TRANSMITTER.

SPECIFICATION forming part of Letters Patent No. 710,309, dated September 30, 1902.

Application filed January 11, 1902. Serial No. 89,252. (No model.)

*To all whom it may concern:*

Be it known that I, MATHIAS WEISSER, a citizen of the United States, residing at Milwaukee, county of Milwaukee, and State of Wisconsin, have invented new and useful Improvements in Telephone-Transmitters, of which the following is a specification.

My invention relates to improvements in telephone-transmitters; and it pertains more especially to the peculiar construction and arrangement of the parts whereby I am enabled to form the rear inclosing shell of light thin material and to secure the same in place without the use of any additional screws or parts for such purpose.

The construction of my invention is explained by reference to the accompanying drawings, in which—

Figure 1 represents a side view of my device; and Fig. 2 represents a rear view of the front of the transmitter and the bracket, by which it is connected with the supporting-arm.

Like parts are identified by the same reference-letters in both views.

Heretofore it has been common to support the front of the transmitter from the inclosing shell itself and to bolt or otherwise secure said shell rigidly to both the front of the transmitter and its supporting-arm, in which case it becomes necessary to form said shell of thick heavy material and to secure such parts rigidly together by clamping screws or bolts. By my improvements the front A is rigidly secured to the respective arms of the spider B by screws C, and said bracket is rigidly secured to the supporting-arm D by the screws E, whereby said parts are all held rigidly together independently of the inclosing shell.

F represents the inclosing shell, which is spun, pressed, or otherwise formed of thin sheet metal and is held in place against the hub G of the spider by the flanges H of the supporting-arm, between which hub and flanges it is clamped by said retaining-screws E.

It is obvious by this construction that the front A together with the mouthpiece I and the operative parts of the transmitter (not shown) are all rigidly supported from the arm D independently of the shell F, whereby I am enabled to form said shell F, as stated, of thin sheet metal and to hold the same with sufficient rigidity for its purpose by clamping it at its center only, as shown, between the hub G and the flanges H of the supporting-arm.

Having thus described my invention, what I claim as new, and desire to secure by Letters Patent, is—

1. In a telephone-transmitter, the combination comprising a supporting-arm; a spider or bracket rigidly affixed to said arm; a front or body portion rigidly supported from said bracket or spider; and a metallic shell centrally supported between the hub of said bracket or spider and the bearings of said supporting-arms, as set forth.

2. In a telephone-transmitter, a supporting-arm; a spider or bracket; a front or body portion; and a mouthpiece rigidly secured together, in combination with an inclosing shell clamped at its center between the hub of said spider or bracket and the bearings of said supporting-arm, and adapted to bear at its front edge against the rear surface of the front of the transmitter, all substantially as and for the purpose specified.

In testimony whereof I affix my signature in the presence of two witnesses.

MATHIAS WEISSER.

Witnesses:
JAS. B. ERWIN,
C. L. ROESCH.